United States Patent
Yamauchi et al.

(10) Patent No.: US 7,687,019 B2
(45) Date of Patent: Mar. 30, 2010

(54) REFINING APPARATUS FOR SCRAP SILICON USING AN ELECTRON BEAM

(75) Inventors: Norichika Yamauchi, Ichihara (JP); Takehiko Shimada, Yokohama (JP)

(73) Assignee: IIS Materials Corporation, Ltd., Tokyo (JP)

(\*) Notice: Subject to any disclaimer, the term of this patent is extended or adjusted under 35 U.S.C. 154(b) by 1051 days.

(21) Appl. No.: 11/142,658

(22) Filed: Jun. 2, 2005

(65) Prior Publication Data

US 2006/0017203 A1  Jan. 26, 2006

(30) Foreign Application Priority Data

Jun. 3, 2004  (JP) ............... 2004-194722

(51) Int. Cl.
  *C21B 7/18*  (2006.01)
  *H01J 37/06*  (2006.01)
  *C21D 11/00*  (2006.01)

(52) U.S. Cl. .............. 266/184; 266/200; 266/208; 266/250; 266/280; 373/10; 373/13; 164/133; 164/506; 164/437

(58) Field of Classification Search .......... 164/133, 164/437, 506; 266/184, 200, 208, 250, 280; 373/10, 13
See application file for complete search history.

(56) References Cited

U.S. PATENT DOCUMENTS

| | | | | |
|---|---|---|---|---|
| 2,430,389 A | * | 11/1947 | Chubb | 266/149 |
| 4,730,661 A | * | 3/1988 | Stephan | 164/469 |
| 4,871,117 A | * | 10/1989 | Baueregger et al. | 241/23 |
| 5,454,424 A | * | 10/1995 | Mori et al. | 164/469 |
| 5,464,159 A | * | 11/1995 | Wolf et al. | 241/1 |
| 5,762,491 A | * | 6/1998 | Williams et al. | 432/156 |
| 6,264,884 B1 | * | 7/2001 | Grosse et al. | 266/241 |
| 6,389,054 B1 | * | 5/2002 | Stercho | 373/79 |
| 6,416,567 B1 | * | 7/2002 | Edlund et al. | 75/670 |
| 6,712,875 B1 | * | 3/2004 | Jackson et al. | 75/414 |
| 2002/0162419 A1 | * | 11/2002 | Yamamura et al. | 75/688 |

FOREIGN PATENT DOCUMENTS

| JP | 10245216 | | 9/1998 |
|---|---|---|---|
| JP | 2000-247623 | * | 9/2000 |
| JP | 2001-336882 | * | 12/2001 |

\* cited by examiner

*Primary Examiner*—Roy King
*Assistant Examiner*—Lois Zheng
(74) *Attorney, Agent, or Firm*—Michael Tobias

(57) ABSTRACT

A refining apparatus for scrap silicon using an electron beam which is suitable for recycling of scrap silicon which is formed during the manufacture of silicon products such as silicon wafers includes a vacuum chamber, a crucible installed within the vacuum chamber, a hearth which is installed next to the crucible within the vacuum chamber and which receives granular scrap silicon and which melts granular silicon by irradiation with an electron beam and which supplies molten silicon to the crucible, and a raw material supply apparatus which is installed within the vacuum chamber and which stores a prescribed amount of granular scrap silicon and supplies the stored granular scrap silicon via a chute.

13 Claims, 3 Drawing Sheets

REFINING APPARATUS FOR SCRAP SILICON USING AN ELECTRON BEAM

BACKGROUND OF THE INVENTION

This invention relates to a refining apparatus for scrap silicon which can refine scrap silicon rapidly and in large quantities using an electron beam and which can obtain high-purity silicon for use in solar cells, semiconductors, and similar products.

In order to increase the rate of utilization of silicon raw materials, it is desired to reutilize scrap which is produced during the manufacture of silicon wafers from silicon ingots (referred to below as "scrap silicon"). However, scrap silicon contains impurities, so it is necessary to increase its purity before it can be reused.

Japanese Published Unexamined Patent Application Hei 10-245216 discloses that the yield of silicon can be increased by recovering scrap silicon which is produced during the manufacture of silicon for solar cells and returning the recovered scrap silicon to a refining step.

However, that publication merely discloses a technique for improving the yield of silicon in the manufacture of solar cells, and it does not disclose a refining apparatus for carrying out refining suitable for recycling of scrap silicon.

SUMMARY OF THE INVENTION

In light of the above, an object of the present invention is to provide a refining apparatus using an electron beam which can carry out refining suitable for recycling of scrap silicon formed during the manufacture of silicon products such as silicon wafers.

According to one form of the present invention, a refining apparatus for scrap silicon capable of achieving the above-described object includes a vacuum chamber, a crucible disposed within the vacuum chamber, a hearth for melting granular scrap silicon disposed within the vacuum chamber adjoining the crucible, an electron gun for irradiating granular scrap silicon in the hearth with an electron beam to melt the granular scrap silicon, a raw material supply apparatus which is disposed within the vacuum chamber and stores a prescribed amount of the granular scrap silicon and supplies the stored granular silicon to the hearth, and optionally a chute disposed between the raw material supply apparatus and the hearth for guiding granular scrap silicon from the raw material supply apparatus to the hearth.

In a refining apparatus for scrap silicon according to the present invention, the raw material supply apparatus which stores a prescribed amount of granular scrap silicon and supplies the stored granular scrap silicon to the hearth is disposed inside the vacuum chamber. Accordingly, if granular scrap silicon which is obtained by pulverizing lumps of scrap silicon is placed into the raw material supply apparatus and operation of the refining apparatus is started, continuous operation can be carried out until the granular scrap silicon inside the raw material supply apparatus runs out, so the efficiency of refining operations can be greatly increased. With a refining apparatus which does not include such a raw material supply apparatus, it is necessary to repeatedly carry out the process of supplying granular scrap silicon to a hearth in small amounts at a time and then melting the scrap silicon, and it is necessary to restore the vacuum within the vacuum chamber each time granular scrap silicon is supplied to the hearth, so the operating efficiency of the refining apparatus becomes extremely poor.

Of the inner walls of the raw material supply apparatus, those portions which are contacted by granular scrap silicon are preferably coated with a synthetic resin. When the raw material supply apparatus is a vibratory parts feeder, at least the inner peripheral surface of a hopper of the parts feeder is preferably coated with a synthetic resin. As a result of this coating, contact between the granular scrap silicon and metal wall surfaces can be prevented, and contamination of the granular scrap silicon by metal elements can be avoided.

From the standpoint of cooling, the chute preferably comprises a metal such as copper and is preferably water-cooled. However, if the chute is made entirely of metal, granular scrap silicon can contact the metal walls of the chute as it falls from the raw material supply apparatus onto the chute, and contamination of the granular scrap silicon by metal elements can occur. Therefore, a silicon lining is preferably provided on surfaces of the chute to prevent contact between granular scrap silicon and metal wall surfaces of the chute and prevent contamination of the granular scrap silicon by metallic elements in the wall surfaces. The silicon lining is preferably a plate cut from a high-purity silicon ingot.

When granular scrap silicon falls from the raw material supply apparatus onto the chute, there is the possibility of a portion of the granular scrap silicon or fragments thereof scattering and flying into the crucible. If granular scrap silicon enters the crucible, low-purity scrap silicon is mixed into the high-purity refined molten silicon in the crucible, and it becomes difficult to manufacture product silicon of high purity. Therefore, a separator which prevents scattering of granular scrap silicon or fragments thereof into the crucible is preferably provided between the crucible and the raw material supply apparatus. By providing a separator between the crucible and the raw material supply apparatus, the scattering of granular scrap silicon or fragments thereof into the crucible is prevented, so the above-described problem can be avoided. The separator is preferably made of a material having carbon or quartz as a main component. When the separator is made of such a material, the necessary heat resistance and impact resistance are obtained, and cooling becomes unnecessary, so the structure of the separator can be simplified. Alternatively, the separator can be made of copper. In this case, cooling can be easily carried out. A silicon lining may be provided on a copper separator.

A cold trap is preferably disposed above the body of the crucible to capture impurity elements which are vaporized from the molten silicon within the crucible. The impurity elements which are vaporized from the molten silicon can be solidified by the cold trap and prevented from again falling into the molten silicon, so it becomes possible to manufacture product silicon of higher purity. The cold trap is preferably capable of being moved up and down with respect to the body of the crucible so that its height with respect to the crucible body can be adjusted in accordance with the amount of molten silicon in the crucible. As a result, the capture rate of impurity elements which are vaporized can be increased.

The hearth is preferably capable of being tilted so that after granular scrap silicon is melted within the hearth, the hearth can be tilted to supply the molten silicon to the crucible. This enables supply of molten silicon from the hearth to the crucible to be smoothly carried out with a relatively simple structure.

With a refining apparatus for scrap silicon according to the present invention using an electron beam, a raw material supply apparatus which stores a prescribed amount of granular scrap silicon and supplies the stored granular scrap silicon to a hearth is provided inside a vacuum chamber, so a large amount of granular scrap silicon can be efficiently supplied to a hearth, and the manufacturing efficiency of high-purity silicon can be enormously improved.

DESCRIPTION OF PREFERRED EMBODIMENTS

Below, an embodiment of a refining apparatus for scrap silicon according to the present invention using an electron beam will be described based on the accompanying drawings.

Figure 1:
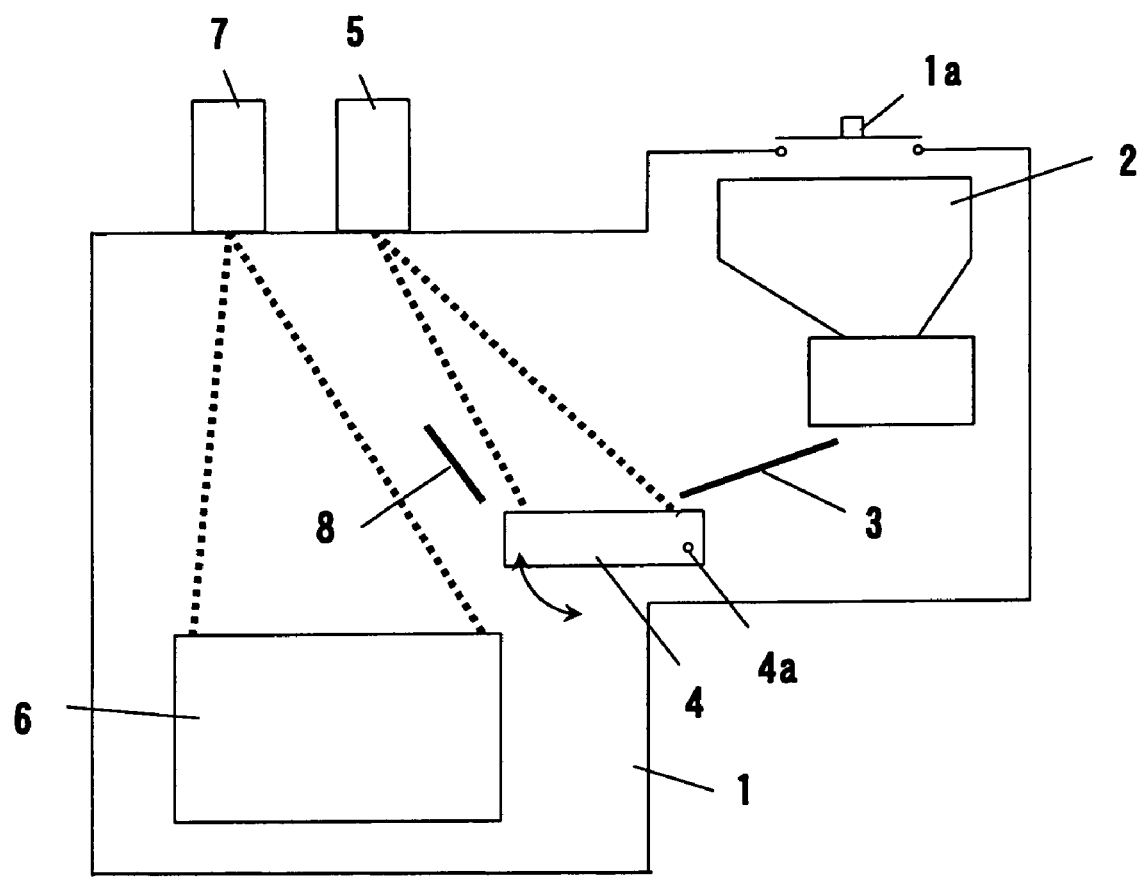
FIG. 1 is a schematic elevation showing the overall structure of an embodiment of a refining apparatus for scrap silicon according to the present invention.

As shown in FIG. 1, this embodiment of a refining apparatus for scrap silicon according to the present invention using an electron beam includes a vacuum vessel (a vacuum chamber) 1, a raw material supply apparatus 2 installed inside the vacuum vessel 1, a hearth 4 which is installed inside the vacuum vessel 1 and which receives granular scrap silicon supplied from the raw material supply apparatus 2 via a chute 3, an electron gun 5 which irradiates granular scrap silicon within the hearth 4 with an electron beam and melts it, a crucible 6 to which a melt is supplied from the hearth 4, and an electron gun 7 which irradiates the melt within the crucible 6 with an electron beam.

Figure 2:
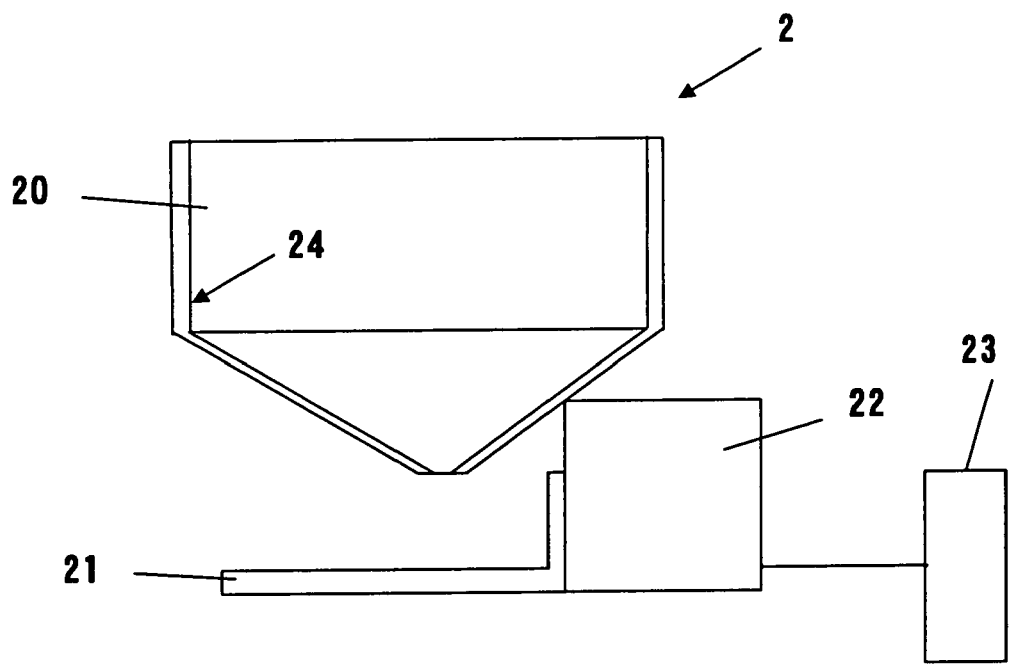
FIG. 2 is a schematic elevation showing the structure of the raw material supply apparatus of the embodiment of FIG. 1.

The vacuum vessel 1 is connected to an unillustrated vacuum pump. The upper portion of the vacuum vessel 1 is equipped with a removable lid 1a which hermetically seals an opening through which a raw material in the form of granular scrap silicon can be supplied to the material supply apparatus 2 from the exterior of the vacuum vessel 1. The raw material supply apparatus 2 comprises a commercially available vibratory parts feeder (e.g., a JA-type bulk hopper of SANKI Co., Ltd.) modified for use in a high-temperature vacuum by, for example, replacement of parts made of iron with parts made of stainless steel in order to prevent formation of rust in the high-temperature vacuum, and replacement of ordinary grease with grease for use in a vacuum. As shown in FIG. 2, the raw material supply apparatus 2 includes a metal hopper 20 which functions as a raw material holding portion, a raw material moving portion 21 which by vibrating moves granular scrap silicon to a horizontal position corresponding to the upper end of the chute 3 and then drops it onto the chute 3, a drive portion 22 which imparts prescribed vibrations to the raw material moving portion 21, and a controller 23 which controls the drive portion 22 and is installed outside the vacuum vessel 1. A command can be input to the controller 23 to control the magnitude of the vibrations, whereby the supply speed of the granular scrap silicon can be varied. A coating of a synthetic resin such as polyethylene is provided on those portions of the inner peripheral surface of the hopper 20 which could be contacted by granular scrap silicon in the absence of a coating. In addition, the raw material moving portion 21 is made from a synthetic resin. As a result, granular scrap silicon does not come into contact with metal surfaces in the hopper 20 or the raw material moving portion 21, and metallic impurities can be prevented from adhering to the granular scrap silicon in the hopper 20 or the raw material moving portion 21.

Figure 3:
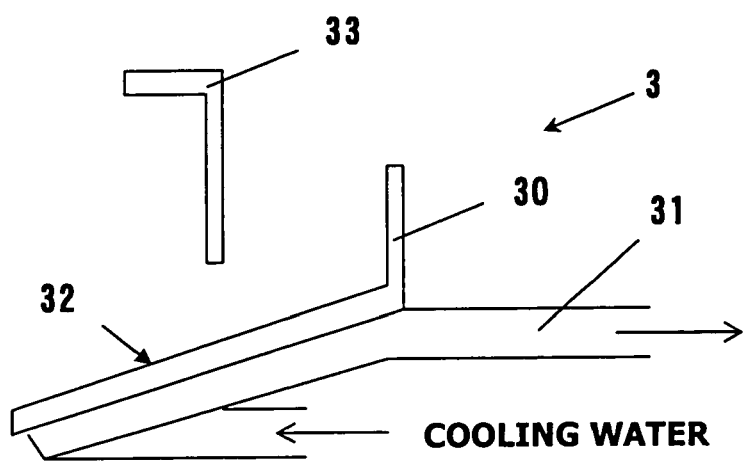
FIG. 3 is a schematic view showing the structure of the chute of the embodiment of FIG. 1.

As shown in FIG. 3, the chute 3 includes a chute body 30 which is made of copper and which is sloped at an angle of approximately 15-60° with respect to the horizontal in order to guide granular scrap silicon which falls onto the chute 3 from the raw material supply apparatus 2 to the hearth 4. The chute 3 also includes a cooling water pipe 31 which cools the chute body 30 and mitigates the effect of radiated heat from the silicon which is melted in the hearth 4. In this embodiment, the chute 3 has an upper surface and an unillustrated pair of side walls. A silicon lining 32 is provided on portions of the upper surface and side walls which could be contacted by granular scrap silicon in the absence of a lining to prevent impurities in the chute body 30 from being mixed into the granular scrap silicon. The silicon lining 32 preferably comprises a silicon plate which is cut from a high-purity silicon ingot (having about the same purity as the silicon which is obtained by refining) or from a silicon ingot containing the same impurities as the scrap silicon which is being refined (antimony in the case of the present embodiment). A partition 33 for shielding the raw material supply apparatus 2 against thermal radiation is provided above the chute 3, and a carbon separator 8 for preventing a portion of the granular scrap silicon or fragments thereof from flying into the crucible 6 is provided between the hearth 4 and the crucible 6.

Although not shown in the drawings, the hearth 4 has a recess in its upper portion for receiving granular scrap silicon and a pouring opening through which molten silicon can be poured into the crucible 6. The hearth 4 is supported so as to be able to swing up and down about a pivot axis 4a. When molten silicon is poured from the hearth 4 into the crucible 6, the hearth 4 can be tilted by an unillustrated actuator so that its left side (the side adjoining the crucible 6) in FIG. 1 is lowered.

Figure 4:
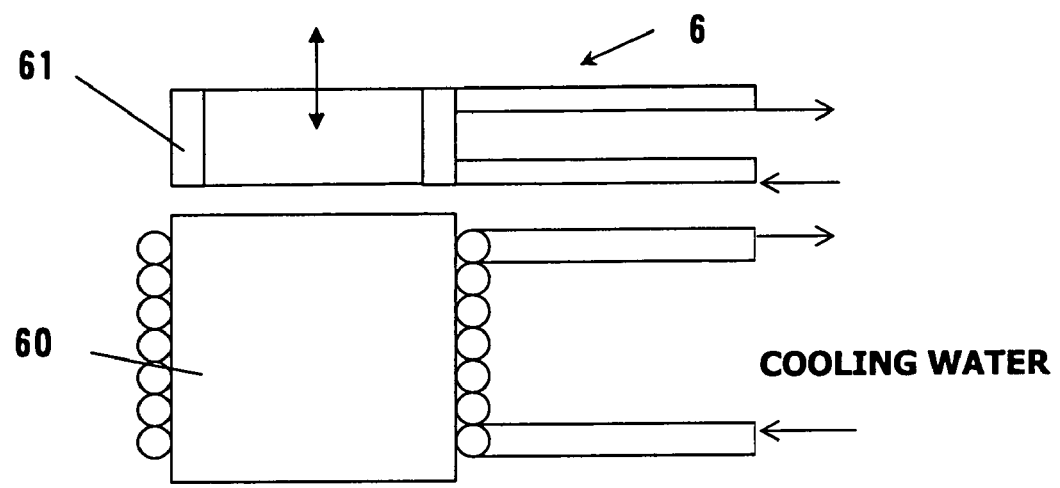
FIG. 4 is a schematic view showing the structure of the crucible of the embodiment of FIG. 1.

As shown in FIG. 4, the crucible 6 includes a water-cooled crucible body 60 made of copper and a water-cooled cold trap 61 installed above the crucible body 60. The cold trap 61, which is made of copper, for example, captures impurities which are vaporized from the melt by irradiation with an electron beam from electron gun 7. The cold trap 61 is preferably supported so as to be able to move up and down with respect to the crucible body 60 so as to change its height in accordance with the amount of molten silicon in the crucible body 60, whereby the rate of capture of impurity elements which are vaporized can be increased.

Next, the operation of the above-described embodiment of a refining apparatus according to the present invention will be described. First, lumps of scrap silicon are pulverized to form granular scrap silicon. The lid 1a of the vacuum vessel 1 is opened, and the hopper 20 of the raw material supply apparatus 2 is filled with granular scrap silicon. The lid 1a is then closed, and a vacuum of a prescribed level is created inside the vacuum vessel 1. The raw material supply apparatus 2 is then operated, and the granular scrap silicon inside the hopper 20 is discharged onto the chute 3 at a prescribed speed and is supplied to the hearth 4 by the chute 3. When a prescribed amount of granular scrap silicon has been supplied to the hearth 4, electron gun 5 is operated and an electron beam irradiates the granular scrap silicon within the hearth 4 and melts it to obtain a melt having a prescribed temperature.

When the melting is completed, the hearth 4 is tilted and molten silicon is poured from the hearth 4 into the crucible body 60. Before the melt in the crucible 6 solidifies, electron gun 7 positioned above the crucible 6 is operated to irradiate the melt in the crucible 6 with an electron beam and further vaporize impurity elements contained in the melt. When the required purity of silicon is low, the operation of irradiating the melt in the crucible 6 with an electron beam from electron gun 7 may be omitted.

The above-described operation (supply of granular scrap silicon from the raw material supply apparatus 2 to the hearth 4, melting of the granular scrap silicon in the hearth 4, pouring of molten silicon from the hearth 4 into the crucible 6, and irradiation of the melt in the crucible 6 with an electron beam) is repeated until the melt in the crucible 6 reaches a prescribed level. Then, the crucible 6 is cooled and the melt is solidified. At this time, directional solidification of the silicon melt occurs, and heavy metals contained in the raw material silicon are removed by segregation. Namely, during the solidification of the melt, heavy metals move to the liquid phase, and at the end of the solidification, the heavy metals solidify in an end portion of a resulting lump of silicon. After completion of the solidification, the end portion of the lump of silicon is cut off so as to remove the heavy metals. In this manner, a high-purity silicon lump is obtained.

In the above-described embodiment, the raw material supply apparatus 2 employs a vibratory parts feeder. However, other types of devices may be used as the raw material supply apparatus 2, such as a combination of a hopper and a screw feeder, a combination of a hopper and a gate mechanism, a combination of a container and a manipulator, or a combination of a container and a conveyer.

As described above, a refining apparatus according to the present invention can be used for recycling of scrap silicon for manufacturing high-purity silicon from scrap silicon which contains impurity elements and which is produced during the manufacture of silicon products such as silicon wafers.

What is claimed is:

1. A refining apparatus for scrap silicon using an electron beam, comprising:
   a vacuum chamber;
   a crucible disposed inside the vacuum chamber;
   a hearth disposed inside the vacuum chamber where it can supply a melt to the crucible;
   an electron gun for irradiating granular scrap silicon in the hearth with an electron beam;
   a raw material supply apparatus disposed inside the vacuum chamber and including a hopper for receiving granular scrap silicon;
   an inclined open-topped chute down which granular scrap silicon can slide between the raw material supply apparatus and the hearth, the chute having an upper end onto which the raw material supply apparatus can drop granular scrap silicon and a lower end disposed where it can drop granular scrap silicon into the hearth; and
   a partition disposed above the chute in a location so as to shield the raw material supply apparatus against thermal radiation from the hearth, a space between the partition and the upper end of the chute defining an opening through which granular scrap silicon can be introduced onto the chute by the raw material supply apparatus.

2. A refining apparatus for scrap silicon as claimed in claim 1, wherein at least a portion of the inner wall surfaces of the raw material supply apparatus is coated with a synthetic resin.

3. A refining apparatus for scrap silicon as claimed in claim 2, wherein at least an inner peripheral surface of the hopper of the raw material supply apparatus is coated with a synthetic resin.

4. A refining apparatus for scrap silicon as claimed in claim 1, wherein the chute is water-cooled.

5. A refining apparatus for scrap silicon as claimed in claim 1, including a separator provided between the crucible and the raw material supply apparatus in a location where it can prevent scrap silicon or fragments thereof from the raw material supply apparatus from flying into the crucible.

6. A refining apparatus for scrap silicon as claimed in claim 5, wherein the separator is made from a material having carbon, copper, or quartz as a main component.

7. A refining apparatus for scrap silicon as claimed in claim 1, wherein the crucible includes a crucible body and a cold trap which captures impurity elements which are vaporized from the molten silicon within the crucible provided above the crucible body.

8. A refining apparatus for scrap silicon as claimed in claim 7, wherein the cold trap can move upwards and downwards with respect to the crucible body.

9. A refining apparatus for scrap silicon as claimed in claim 1 wherein the chute is inclined at 15-60 degrees to the horizontal.

10. A refining apparatus for scrap silicon as claimed in claim 1 wherein the raw material supply apparatus comprises a vibratory parts feeder including a vibrating horizontal moving portion which is disposed beneath the hopper and has an end disposed above the chute so as to drop granular scrap silicon onto the chute.

11. A refining apparatus as claimed in claim 1 wherein the chute comprises a metal having a silicon lining comprising a plate cut from a silicon ingot for preventing the metal from contacting granular scrap silicon sliding down the chute.

12. A refining apparatus as claimed in claim 1 wherein the hopper of the material supply apparatus contains granular scrap silicon containing an impurity, and the silicon lining contains the same impurity as the scrap silicon in the hopper.

13. A refining apparatus for scrap silicon as claimed in claim 12 wherein the scrap silicon in the hopper and the silicon lining both contain antimony.

* * * * *